Patented Aug. 10, 1943

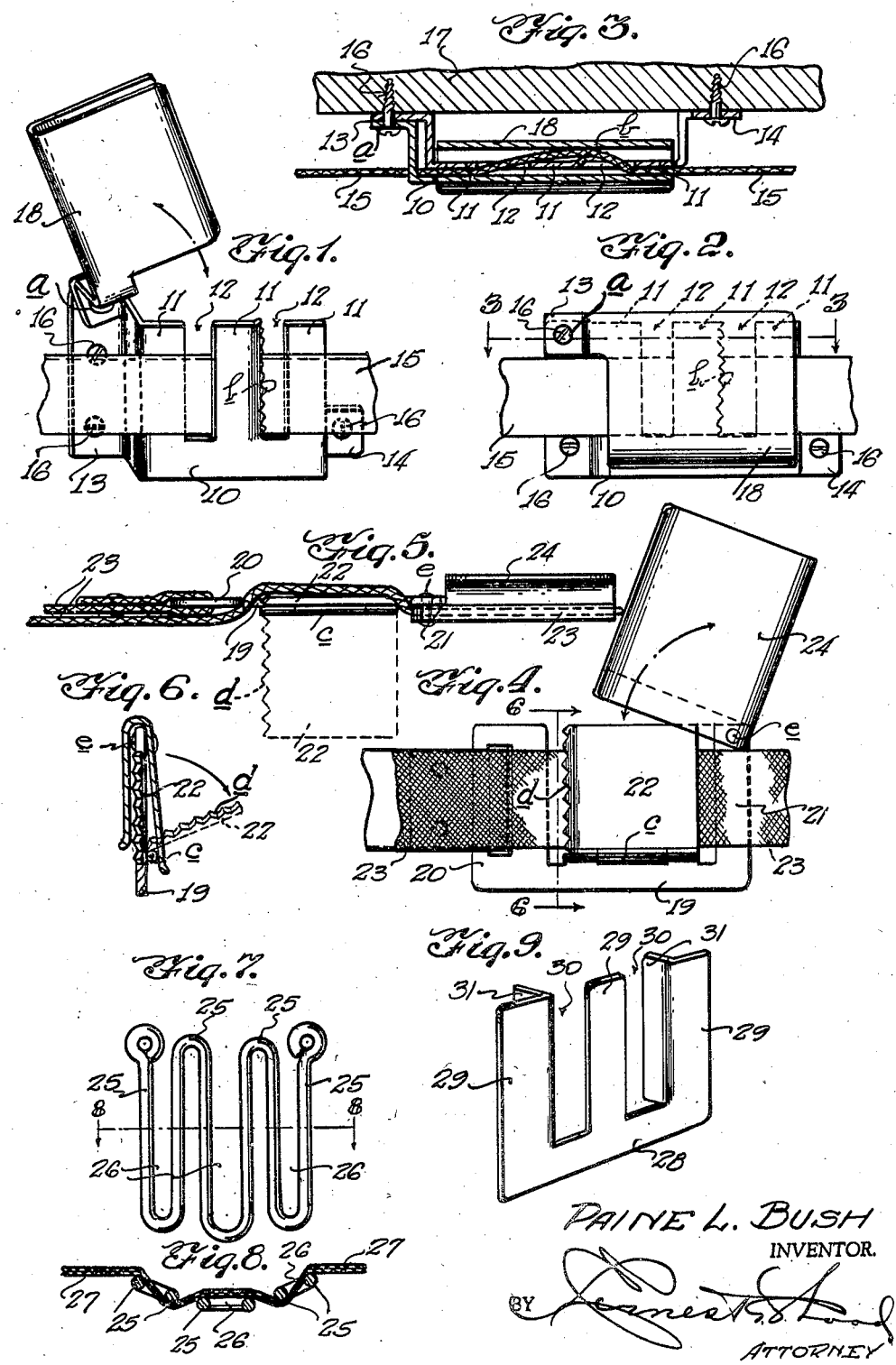

2,326,328

UNITED STATES PATENT OFFICE 2,326,328

STRAP FASTENER

Paine L. Bush, Dallas, Tex.

Application July 10, 1942, Serial No. 450,371

5 Claims. (Cl. 24—170)

This invention relates to strap fastening devices and more particularly to devices serving in the capacity of belt buckles, slides and retainers.

The principal object of the invention is to provide a device having many applications, among its uses being a fastener for straps employed for binding luggage, for securing loads on vehicles and as belt retainers for wearing apparel, its chief advantage lying in the fact that a strap or belt is inserted from the side instead of through apertures of a frame as in most conventional buckles and which advantage makes for speedy securement of the strap or belt which it secures.

Another object of the invention is to provide a strap retainer which has a series of relatively parallel and spaced prongs or legs, about which the strap or belt is passed and which, through frictional contact with the strap or belt, combined with such auxiliary friction supplying means as may be required, will hold the strap or belt against longitudinal slippage.

Broadly, the invention provides a strap fastener which can be quickly and easily manipulated inasmuch as the end of the strap is not required to be threaded therethrough but may be inserted into the fastener at any point intermediate the ends of the strap. This is desirable in cases where the fastener is used in extremely cold or inclement weather for securing load binding straps as, for example, on trucks and other vehicles, used particularly in emergency cases requiring speedy but inconvenient travel.

With the foregoing objects as paramount, the invention has particular reference to certain salient features of construction and arrangement of parts, to become manifest as the description proceeds, taken in connection with the accompanying drawing, wherein:

Figure 1 is a front perspective view of a strap fastener constructed according to the present invention.

Figure 2 is a front elevational view with the friction clip in closed position.

Figure 3 is a view in longitudinal cross section, taken on line 3—3 on Figure 2.

Figure 4 is a modified form of the fastener shown in Figures 1 to 3.

Figure 5 is a plan view thereof.

Figure 6 is a vertical section taken on line 6—6 on Figure 4.

Figure 7 is a further modified form of the invention.

Figure 8 is a transverse section taken on line 8—8 on Figure 7, and

Figure 9 is still another modification of the invention.

Supplementing the objects of the invention heretofore expressed, it is pointed out that in each of the various forms thereof illustrated, the feature of the open side or end prevails. However, in certain cases, the strap receiving recesses are closed as by a pivoted clip when needed, to add frictional resistance to any tendency to longitudinal displacement or to prevent lateral displacement of the strap.

Continuing more in detail with the drawing, reference is primarily made to Figures 1 to 3 wherein 10 denotes a frame which is formed to provide prongs 11, defining recesses 12 therebetween. At one end of the body or frame 10, a flange 13 is formed by bending the same at right angles, then parallel with the plane of the body. The opposite end of the body is similarly formed but cut away to define a narrow flange 14 so that a strap 15, in passing between the prongs 11, will have sufficient clearance above the said flange 14.

The flanges 13 and 14 serve as a base for the fastener and are each apertured to receive screws 16 which secure the fastener to a support 17, such as a truck body or other structure on which a strap may be needed.

Pivoted at a to the flange 13 is the tail of a clip 18. This clip is constructed of a material having inherent resiliency and is substantially U-shaped in cross section to straddle the prongs 11 as well as the strap 15 when all elements are in the position shown in Figures 2 and 3. When in this position, i. e., over the prong 11 next adjacent the pivoted point a of the clip, under the intermediate prong and over the next prong 11, the strap is partly held against longitudinal slippage by the serrated edge b of the intermediate prong 11 but is positively held against such slippage when the clip 18 is rotated into position, with both wings thereof bearing against the strap to bind the same against the prongs.

The drawing shows but a single lead of the strap extending through the fastener. Ordinarily, one end of the strap is affixed at a point, probably on the truck body, spaced from the fastener while the opposite end is held by the fastener. It is apparent that no restrictions as to position or use of the fastener are necessary as it may be used in many cases, including the suspending of objects from a wall and the like.

In Figures 4 to 6 inclusive an analogous form of the invention is shown. In this form, a frame or body 19 has a loop 20 at one end and a parallel prong 21 at the opposite end, leaving an intermediate space which is occupied by a tongue 22, hinged at c to the frame. This tongue has a serrated edge d which serves to hold the belt 23 against longitudinal slippage when in operative position.

Pivoted at e at one corner to the prong 21 is a clip 24. This clip is of substantially U-shape in transverse section. One end of the belt 23 is secured to the loop 20 in the manner shown and after passing about the body, in case of its use as a support for wearing apparel, it is disposed across the outer faces of the loop 20 and prong 21, with the tongue 22 in the position shown in dotted lines in Figures 5 and 6. After the tongue is moved upward into a plane flush with the body 19, the clip 24 is moved downward to straddle the body and belt as shown in Figure 5 in solid lines. Thus, the belt is positively held against longitudinal displacement.

Figures 7 and 8 are respectively front elevation and transverse sectional views of still another form of the invention. This example is analogous in the respect that the belt is received from the top or side as the case may be but is intended more as a retainer slide than a clasp, the object being to provide a slide retainer for belts on ladies' wearing apparel which is subject to little strain and may be manipulated with ease. This slide consists of wire, convoluted to form prongs 25 defining intermediate spaces 26, open at the top and into which the belt 27 is laterally thrust. Two thicknesses of the belt are shown lying in the slide in Figure 8 which is intended to indicate that after passing around the body, the remaining portions of the belt are disposed in the spaces between the prongs and through the friction supplied both by the belt and contacting prongs, little displacement will occur unless undue strain is imposed thereon.

Figure 9 illustrates another embodiment of the form of the invention shown in Figures 7 and 8 and just described. In this form, the same principle is carried out but as a stamping. The frame or body 28 is formed to provide a plurality of relatively parallel prongs 29 to define spaces 30 therebetween which receive a belt or strap, not shown, in the same manner as described earlier. As a means to promote greater frictional resistance on the belt, the inner edges of each of the outer prongs are bent at right angles to the plane of the body 28 to form flanges 31. The belt is passed under the end prongs and over the intermediate prong, thus to bear against the edges of the flanges 31 and in so doing will be less likely to slip longitudinally.

Manifestly, the construction as shown and described is capable of some modification and such modification as may be construed to fall within the scope and meaning of the appended claims is also considered to be within the spirit and intent of the invention.

What is claimed is:

1. A strap fastening device including a body formed with a plurality of relatively parallel prongs defining parallel recesses, open at their ends to receive a strap to produce therein a bend or a series of bends imposing frictional resistance on said strap, a clip substantially U-shape in transverse section, pivoted at one corner to a corner of said body and whose sides are adapted to overlie and frictionally bear against the sides of said strap to retain the latter in said recesses.

2. A strap fastening device including a body having a series of relatively parallel prongs in transverse relation thereto and between which a strap is laterally passed for retention by frictional engagement with said prongs, a pivoted clip having relatively parallel sides substantially equal in length and width to the length and width of said body and adapted to receive the latter to afford friction on said strap in addition to that imposed thereon by the bends in said strap effected by its engagement with said prongs.

3. As a new article of manufacture, a strap fastener comprising a body having a series of laterally extending prongs defining elongated, open ended recesses in transverse relation to said body and adapted to receive a strap intermediate its ends, a clip pivoted to one of said prongs having sides to substantially enclose said body and adapted to bear upon said strap and body on both sides to augment frictional resistance on said belt caused by its engagement with said prongs.

4. As a new article of manufacture, a strap securing device comprising a body having a series of elongated, open ended recesses adapted to receive a strap intermediate its ends to produce therein a series of bends, a pivoted clip entirely enclosing said recesses and substantially enclosing said body to retain said strap and at the same time imposing on either side thereof frictional resistance to hold said strap against longitudinal displacement in said body.

5. As a new article of manufacture, a body formed with a plurality of prongs to define intermediate, elongated recesses having open ends to receive a strap intermediate its ends and to produce therein a series of transverse bends to hold the same against longitudinal displacement, a clip provided with side walls having inherent resiliency adapted to receive and substantially enclose said body and whose side walls bear frictionally against portions of both sides of said body and strap to impose pressure upon the latter and means retaining said clip for pivotal movement into and out of engagement with said body.

PAINE L. BUSH.